United States Patent [19]

Davies

[11] 4,008,904
[45] Feb. 22, 1977

[54] FIFTH WHEEL COUPLING

[75] Inventor: Philip Morey Davies, Potters Bar, England

[73] Assignee: Davies Magnet Works Limited, Ware, England

[22] Filed: Aug. 29, 1975

[21] Appl. No.: 608,979

[30] Foreign Application Priority Data

Sept. 10, 1974 United Kingdom ............ 39467/74

[52] U.S. Cl. .............................................. 280/435
[51] Int. Cl.[2] ......................................... B62D 53/10
[58] Field of Search ............ 280/435, 436, 437, 508

[56] References Cited

UNITED STATES PATENTS

| | | | |
|---|---|---|---|
| 2,907,583 | 10/1959 | Dalton | 280/435 |
| 3,485,513 | 12/1969 | Walther | 280/435 |

FOREIGN PATENTS OR APPLICATIONS

| | | | |
|---|---|---|---|
| 229,250 | 7/1960 | Australia | 280/435 |

Primary Examiner—Robert R. Song
Assistant Examiner—John A. Pekar
Attorney, Agent, or Firm—Burns, Doane, Swecker & Mathis

[57] ABSTRACT

A fifth wheel coupling for mounting on a towing vehicle and for coupling to a trailer king pin, comprising a coupling plate, a pair of jaws operatively connected to the plate and having opposing king pin receiving recesses with their centers forwardly of the axis of rotation of the jaws and having faces forming a rearwardly directed recess when the jaws are closed, a locking plunger movable with respect to the plate and urged into the recess, a trip member mounted on the plate and urged to maintain the plunge in an inoperative position out of said recess and trippable by closing movement of at least one of the jaws, a locking block movable with respect to the plate and plunger from an inoperative position to an operative position in which it prevents movement of the plunger out of the recess, and an actuating member mounted on the plate and movable, by movement of the block to its inoperative position, to move the plunger out of the recess to free the jaws.

7 Claims, 2 Drawing Figures

FIFTH WHEEL COUPLING

BACKGROUND OF THE INVENTION

1. Field of the Invention

This invention relates to fifth wheel couplings for mounting on towing vehicles and have locking jaws engageable round a king pin on a trailer when the towing vehicle is backed under the trailer, thereby connecting the trailer to the towing vehicle for transport purposes.

2. Description of the Prior Art

Known fifth wheel couplings have a fifth wheel coupling plate mounted on the towing vehicle and provided with a pair of locking jaws rotatably mounted thereon; the jaws have opposing recesses forwards of their axes of rotation to enable them to close round and rotatably retain a king pin on the towed trailer. The jaws are locked in the closed clamping position by a spring urged sliding plunger movable into a slot formed at an oblique angle to the front-rear axis of the coupling so as to prevent the jaws rotating to release the king pin. Means are provided for withdrawing the plunger to free the jaws when it is desired to disconnect the trailer from the towing vehicle.

When the trailer is coupled to the towing vehicle by such fifth wheel couplings and towed, especially over bumps in a road, considerable risks are involved of the locking plunger bouncing or shaking away from the jaws which then release the king pin so that the trailer becomes detached. This is due to the considerable vibration and jolting which occurs during travel and although locking devices have been used to prevent rearward movement of the plunger during travel, they have suffered from the disadvantage of being complicated constructions and expensive to manufacture, install and maintain, and also that such locking means themselves become dislodged as a result of the vibration and jolting of the vehicles.

The main object of the present invention is to provide an improved fifth wheel coupling plate in which these disadvantages are minimised or eliminated.

SUMMARY

According to the present invention a fifth wheel coupling for mounting on a towing vehicle for coupling to a trailer king pin comprises a coupling plate, a pair of jaws operatively connected to the plate and having opposing king pin receiving recesses with their centres forwardly of the axis of rotation of the jaws and having faces forming a rearwardly directed recess when the jaws are closed, a locking plunger movable with respect to the plate and urged into the recess, a trip lever mounted on the plate and urged to maintain the plunger in an inoperative position out of said recess and trippable by closing movement of at least one of the jaws, a locking block movable with respect to the plate and plunger from an inoperative position to an operative position in which it prevents movement of the plunger out of the recess, and an actuating member mounted on the plate and movable, by movement of the block to its inoperative position, to move the plunger out of the recess to free the jaws.

Preferably the locking block is urged to move across the rear of the plunger when the plunger is in the recess.

The locking block in one preferred construction is slidably disposed with respect to the plate and extends transversely of the plunger terminating in a hand grip accessible to the outside of the plate, a spring being provided to urge the block to slide across the rear of the plunger.

The actuating member may be a crank lever is preferably pivoted with respect to the plate and has a portion engageable with the plunger and a portion engageable through lost motion means with the block so as to be moved by the block, after withdrawal of the latter from the path of movement of the plunger, to move the plunger rearwardly out of the recess.

BRIEF DESCRIPTION OF THE DRAWINGS

In the two Figures the same references designate the same parts.

DESCRIPTION OF PREFERRED EMBODIMENT

Figure 1:
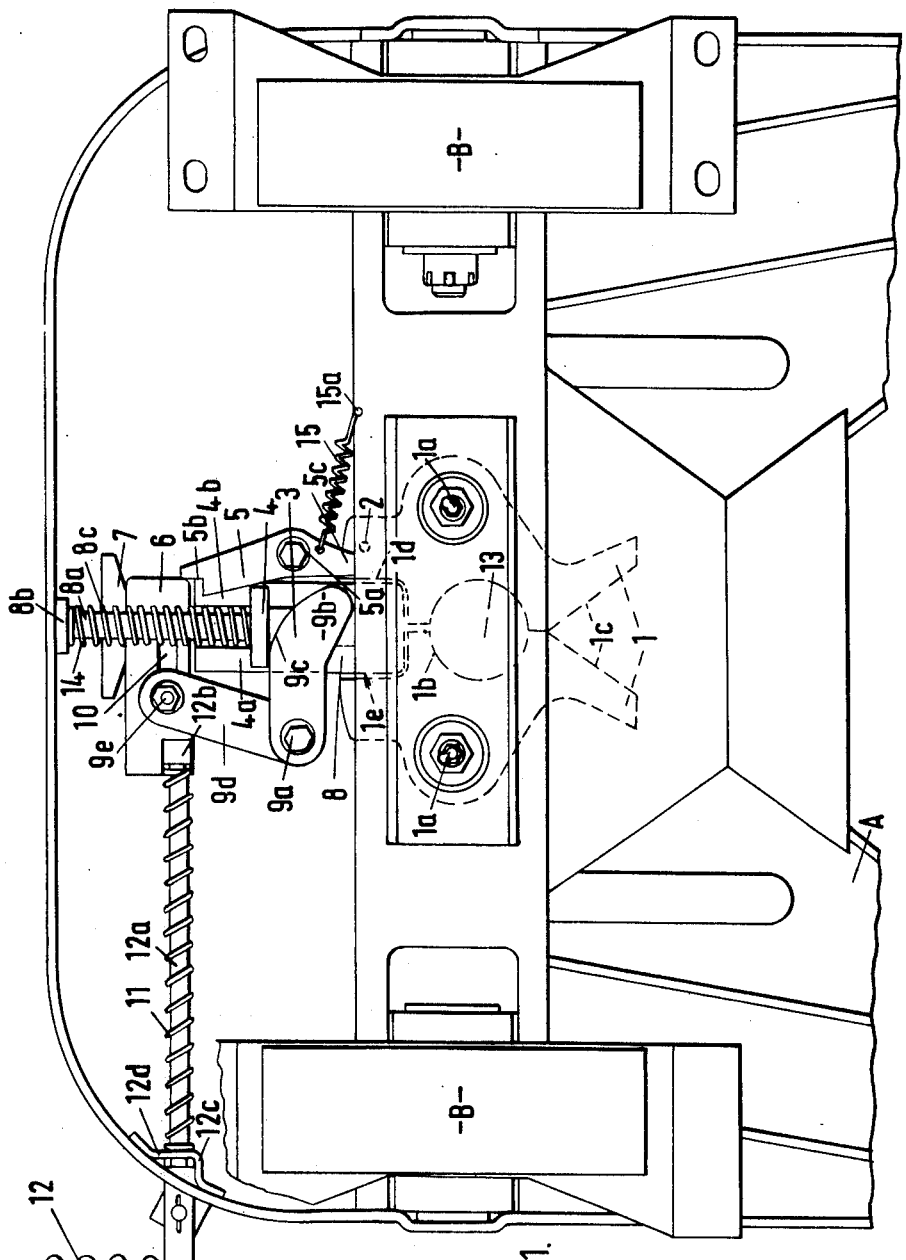
FIG. 1 shows diagrammatically a fifthwheel coupling with the parts in the locked or coupling position; and, FIG. 2 is a view of parts of the coupling in FIG. 1 showing the parts in the unlocked or inoperative position.

Referring to the drawings these show a fifth wheel coupling plate A which by means of trunnions B can be secured to the rear of a towing vehicle such as a four wheeled tractor powered by a prime mover such as an internal combustion engine. In describing the coupling shown in the drawings the forward parts are at the bottom of the Figures and the rearward parts are at the tops of the Figures.

A pair of jaws 1 are respectively operatively mounted with respect to the plate and shown as pivotable about pivot pins 1a on the plate. The jaws have recesses 1b which when the jaws are closed as in FIG. 1 form a circular recess in which the king pin of a trailer can be clamped. The forward ends of the jaws have diverging faces 1c which aid in the centering of the king pin as the jaws approach the king pin when the tractor is driven under the trailer. Rearwardly of the pivot pins 1a the jaws have cut away faces 1d which when the jaws are closed form a recess 1e engageable by a locking plunger 8.

The plunger 8 is movable in guides (not shown) in the plate so as to move into and out of the recess 1e. The plunger has an upstanding boss 4 and a rearward extension 4a slides on the rod 8a which is anchored at 8b to the rear of the plate A. A compression spring 8c is mounted in compression on the rod between the boss 4 and the rear of the plate A and urges the plunger forwardly into the recess 1e.

Alternatively the plunger 8 is attached to the rod 8a carrying the compression spring 8c, the rod being free to pass through the boss 8b fast on the rear of the plate and this boss also acts as a rear anchor for the compression spring 8c. This compression spring when in the rearward or free position, urges the plunger forwardly to engage the rear faces of the open jaws or into the recess 1e between the closed jaws.

Figure 2:
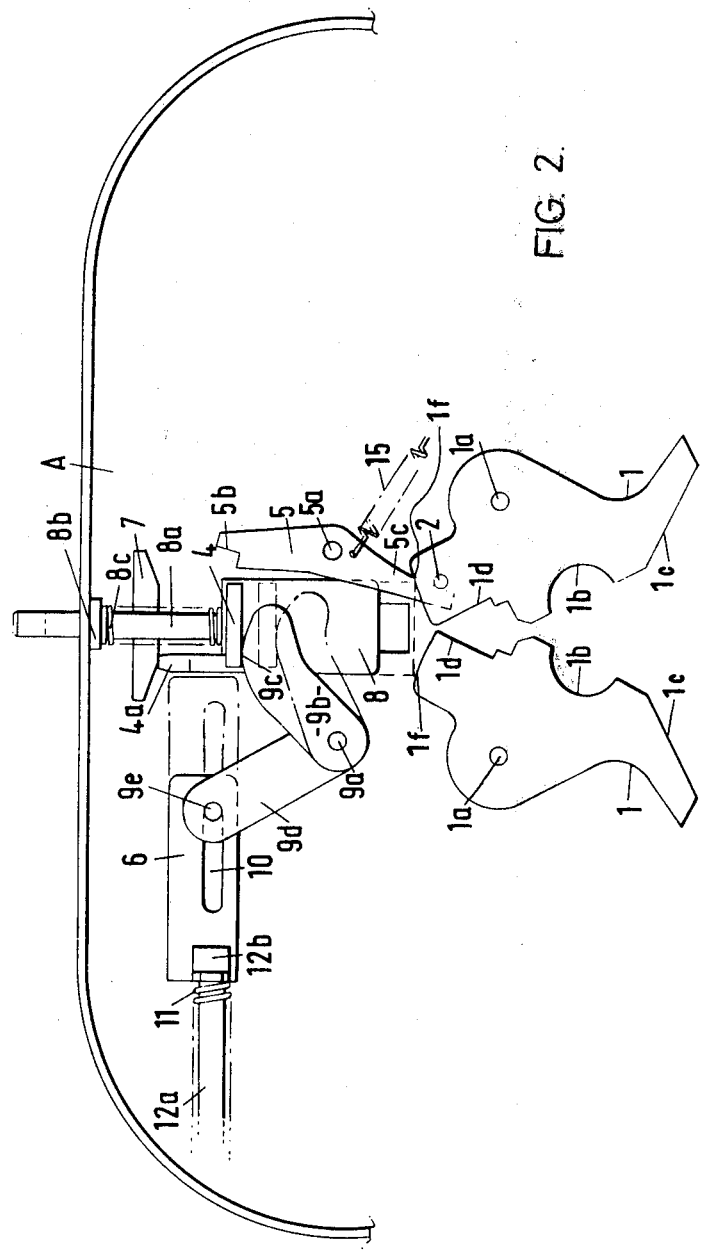

A trip member in the form of a lever 5 is pivotally mounted at 5a on the plate and is urged to move in an anti-clockwise direction by a tension spring 15 the free end of which is anchored to the plate at 15a. The rear end of the trip lever has a cut away portion 5b which when the jaws are closed and the plunger is moved rearwardly will engage on the forward face of the boss 4 and retain the plunger in the inoperative or free position. One of the jaws, the right-hand jaw in the Figures, has a pin 2 which when the jaws are closed impinges on the tail 5c of the trip lever in such a manner, that when the king pin is withdrawn from the recesses 1b of the locking jaws causing the jaws to rotate about the pins 1a, results in the pin 2 pressing against the tail of the trip lever 5 overcoming the tension of the spring 15 and thereby disposing the recess 5b out of the path of movement of the boss 4 with the plunger 8 thus allowing the plunger 8 to move forward under the effort of the tension spring 8c, and, when the jaws are open, to rest on the rearward ends 1f of the jaws as shown on FIG. 2 ready for the recoupling of the king pin in the jaws.

An abutment 7 is fixed on the plate A rearwardly spaced from the rear of the plunger in its rearmost position, at which time the extension 4a engages the abutment leaving at gap 4b.

A locking block 6 is slidably disposed in guides (not shown) in the plate A to move transversely and in front of the abutment 7 and thus transversely of the rod. The block 6 is connected to the shank 12a of a handle 12 projecting beyond the side of the plate. A compression spring 11 is assembled on the shank 12a between an abutment 12b on the shank and a member 12c on the plate and urges the shank and the locking block 6 to the right in the Figures. Thus when the plunger is in the operative i.e. forward position the block 6 is moved by the spring 11 to a position between the abutment 7 and the rear face of the plunger 8 thereby locking the plunger in this position.

An actuating member shown as a crank 9 is pivotally mounted at 9a with respect to the plate and has a portion 9b with a curved nose 9c which engages the forward face of the boss 4. Another portion 9d of the crank carries a pin 9e which is a sliding fit in a slot 10 in the block 6 forming lost motion means. With the parts described in the position shown in FIG. 1 the pin 9e is at the left end of the slot 10 for the purpose to be described.

The operation of the coupling is as follows: with the jaws closed, the jaws can be freed to release a king pin clamped therein by pulling the handle 12 to the left withdrawing the block 6 from the rear of the plunger.

The right hand end of the slot 10 engages the pin 9e and rotates the crank anticlockwise (or clockwise according to the position of the operating crank 12 whether to the left or right of the coupling) so that its nose 9c forces the boss 4 rearwardly withdrawing the plunger 8 from the recess 1e. The king pin upon retraction forces the jaws open since they are now free to pivot and the pin 2 moves the trip lever 5 to release the cut-away part 5b from the boss 4 so allowing the boss to slide past it until the front of the plunger is rearwardly of the rearward end 1f of the jaws in the open position. The extension 4a then engages the abutment 7 and in this position the sliding block 6 is free to move to the right in the Figures under the action of the compression spring 11 until the face of the block 6 comes in contact with the extension 4a of the plunger 8. The pin 9e is now disposed midlength of the slot 10 so that the plunger 8 can move forward to engage the rearwards ends 1f of the jaws. The coupling then is set for a recoupling operation.

When the tractor is reversed under the trailer by the inclined surfaces 1c centre on the king pin and when the rear faces of the recesses 1b engage the king pin they are forced apart until the jaws are closed and the recess 1e has been formed between the jaws. During these movements the faces 1f of the jaws move the plunger rearwards against the action of the spring 8c. As soon as the jaws have closed the plunger is urged by the spring 8c into the recess 1e. The block 6 urged by the spring 11 then moves across between the rear face of the plunger and the front face of the abutment 7.

It will be understood that while the springs 8c, 11 and 15 are shown as the means for urging the parts in the direction described, any other means such as resilient means for example of rubber may be employed in place of one or more of these springs. Where springs are used they may be designed to act in compression or tension as will be understood by anyone skilled in the art.

It will be seen that the fifth wheel coupling of the invention provides a simple means whereby the jaws are locked in their closed position by the plunger which is locked against movement out of the recess 1e. The block 6 moving transversely of the plunger, is not subjected to forces caused by vibration or jolting in the same direction as the forces acting along the plunger 8 and the rod 8a since these two forces are substantially normal to each other and hence do not compliment each other but prevent either of them being effective.

I claim:

1. A fifth wheel coupling for coupling a towing vehicle to a trailer king pin, comprising a coupling plate mountable on said towing vehicle, a pair of jaws rotatably mounted on said plate and having opposing king pin receiving recesses with their centres forwardly of the axes of rotation of said jaws with respect to said plate and having faces forming a rearwardly directed recess when said jaws are closed, a locking plunger movable with respect to the plate and urged into said recess, a trip member mounted on said plate and urged to maintain the plunger in an inoperative position out of said recess and trippable by closing movement of at least one of said jaws, a locking block movable with respect to said plate and plunger from an inoperable position to an operative position in which it prevents movement of said plunger out of said recess, and an actuating member pivoted with respect to said plate and having a portion engageable with said plunger and a portion engageable through lost motion means with said block so as to be moved by said block, after withdrawal of said block from the path of movement of said plunger, to move said plunger rearwardly out of said recess to free said jaws.

2. A fifth wheel coupling according to claim 1 wherein said locking block is biased to move across the rear of said plunger when said plunger is in said recess.

3. A fifth wheel coupling according to claim 1 wherein said locking block is slidably disposed with respect to said plate and extends transversely of said plunger terminating in a hand grip accessible to the outside of said plate, a spring being provided to urge said block to slide across the rear of said plunger.

4. A fifth wheel coupling according to claim 1 wherein said lost motion means comprises an elongated slot in said locking block engaged by a pin on said actuating member such that said actuating member is only moved by said locking block after the latter has moved out of the path of movement of said plunger.

5. A fifth wheel coupling according to claim 1 wherein said actuating member comprises a crank pivoted to said plate and has one arm engageable with said plunger and the other arm engageable through said lost motion means with said locking block.

6. A fifth wheel coupling according to claim 1 wherein said trip member comprises a lever pivoted to said plate with a portion engageable by at least one of said jaws and a portion shaped to engage and retain said plunger out of said recess.

7. A fifth wheel coupling according to claim 1 wherein said trip member is spring urged to engage and hold said plunger out of said recess.

* * * * *